(12) United States Patent
Lubbers et al.

(10) Patent No.: US 6,915,397 B2
(45) Date of Patent: Jul. 5, 2005

(54) SYSTEM AND METHOD FOR GENERATING POINT IN TIME STORAGE COPY

(75) Inventors: Clark E. Lubbers, Colorado Springs, CO (US); James M. Reiser, Colorado Springs, CO (US); Anuja Korgaonkar, Colorado Springs, CO (US); Randy L. Roberson, New Port Richey, FL (US); Robert G. Bean, Monument, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 724 days.

(21) Appl. No.: 10/080,961

(22) Filed: Oct. 22, 2001

(65) Prior Publication Data

US 2003/0079102 A1 Apr. 24, 2003

Related U.S. Application Data

(63) Continuation-in-part of application No. 09/872,597, filed on Jun. 1, 2001.

(51) Int. Cl.[7] .......................... G06F 12/16; G06F 17/30
(52) U.S. Cl. .................... 711/162; 707/204; 711/206
(58) Field of Search ................................ 707/203, 204; 711/162, 202, 203, 206, 207, 208, 209

(56) References Cited

U.S. PATENT DOCUMENTS

| | | | |
|---|---|---|---|
| 5,109,318 A | 4/1992 | Funari et al. | |
| 5,184,281 A | 2/1993 | Samarov et al. | |
| 5,513,314 A | 4/1996 | Kandasamy et al. | |
| 5,815,371 A | 9/1998 | Jeffries et al. | |
| 5,815,649 A | 9/1998 | Utter et al. | |
| 5,822,777 A | 10/1998 | Leshem et al. | |
| 5,832,222 A | 11/1998 | Dziadosz et al. | |
| 5,835,700 A | 11/1998 | Carbonneau et al. | |
| 5,987,622 A | 11/1999 | Lo Verso et al. | |
| 5,996,089 A | 11/1999 | Mann et al. | |
| 6,038,689 A | 3/2000 | Schmidt et al. | |
| 6,073,209 A | 6/2000 | Bergsten | |
| 6,148,414 A | 11/2000 | Brown et al. | |
| 6,188,973 B1 | 2/2001 | Martinez et al. | |
| 6,216,140 B1 * | 4/2001 | Kramer | 715/511 |
| 6,237,112 B1 | 5/2001 | Yoo et al. | |
| 6,243,790 B1 | 6/2001 | Yorimitsu | |
| 6,260,120 B1 | 7/2001 | Blumenau et al. | |
| 6,266,721 B1 | 7/2001 | Sheikh et al. | |
| 6,278,609 B1 | 8/2001 | Suzuki et al. | |
| 6,282,094 B1 | 8/2001 | Lo et al. | |
| 6,282,096 B1 | 8/2001 | Lo et al. | |
| 6,282,610 B1 | 8/2001 | Bergsten | |
| 6,715,050 B2 * | 3/2004 | Williams et al. | 711/164 |

OTHER PUBLICATIONS

NB9404509, IBM Technical Disclosure Bulletin, "Microkernel Extension for Cloning", Apr. 1994.*
Smart Storage Inc., "SmartStor InfiNet™: Virtual Storage for Today's E–economy," Sep. 2000.
Compaq Computer Corporation, "The Compaq Enterprise Network Storage Architecture: An Overview," May 2000.
Compaq Computer Corporation, "Compaq Storage Works" Data Replication Manager HSG80 ACS V8.5P Operations Guide, Mar. 2000.

* cited by examiner

*Primary Examiner*—Gary Portka

(57) ABSTRACT

A storage system permits virtual storage of user data by implementing a logical disk mapping structure that provides access to user data stored on physical storage media and methods for generating point-in-time copies, or snapshots, of logical disks. A snapshot logical disk is referred to as a predecessor logical disk and the original logical disk is referred to as a successor logical disk. Creating a snapshot involves creating predecessor logical disk mapping data structures and populating the data structures with metadata that maps the predecessor logical disk to the user data stored on physical media. Logical disks include metadata that indicates whether user information is shared between logical disks. Multiple generations of snapshots may be created, and user data may be shared between these generations. Methods are disclosed for maintaining data accuracy when write I/O operations are directed to a logical disk.

6 Claims, 15 Drawing Sheets

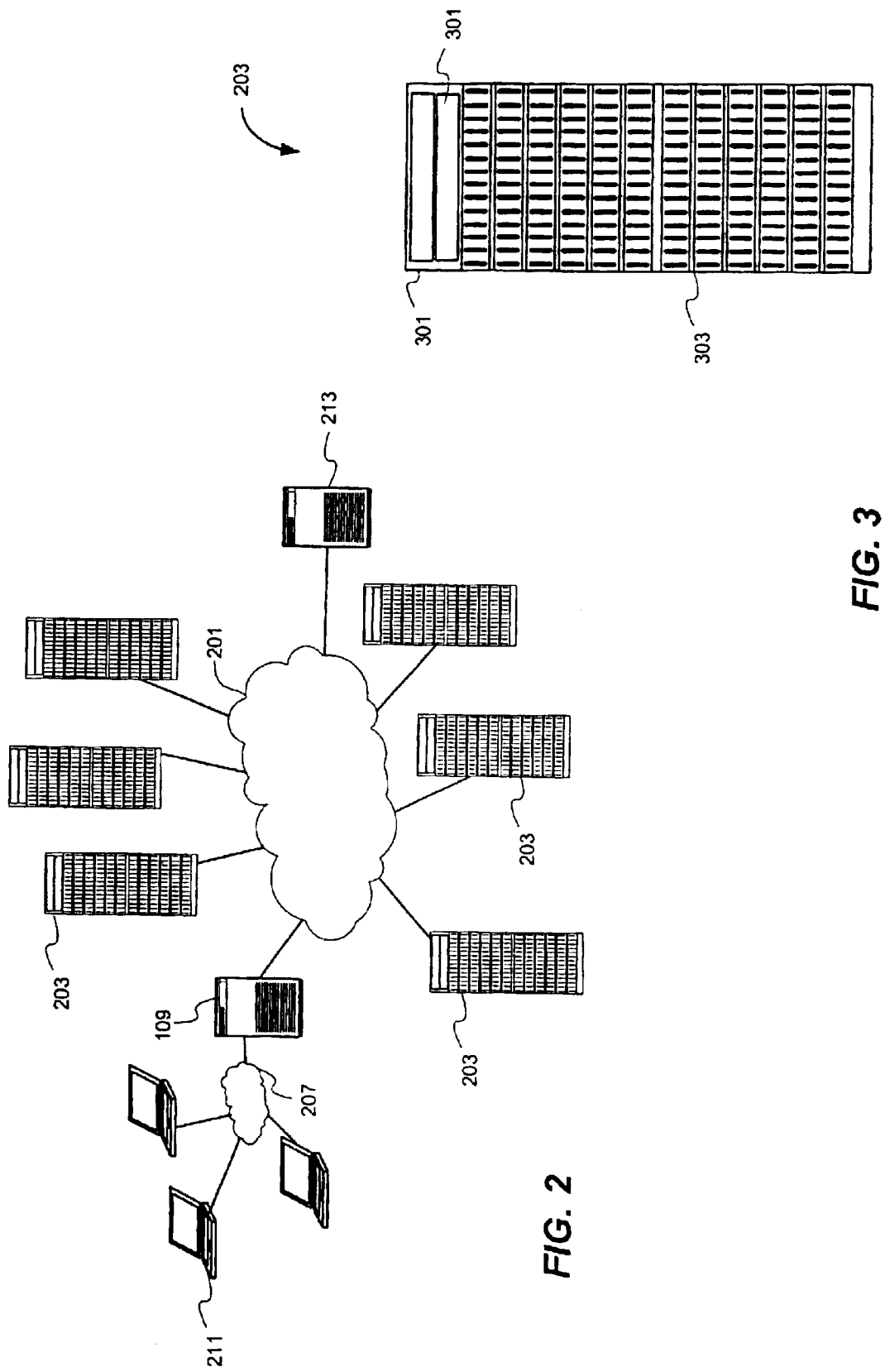

SYSTEM AND METHOD FOR GENERATING POINT IN TIME STORAGE COPY

RELATED APPLICATIONS

This application claims priority, as a continuation-in-part (CIP), from U.S. patent application Ser. No. 09/872,597, entitled PROCESS FOR FAST, SPACE-EFFICIENT DISK COPIES USING PARALLEL DISTRIBUTED TABLE DRIVEN I/O MAPPING, filed Jun. 1, 2001, the disclosure of which is hereby incorporated by reference in its entirety.

BACKGROUND OF THE INVENTION

1. Field of the Invention

The present invention relates generally to computer-based information storage systems. More particularly, the present invention relates to a system and method for generating a copy (or copies) of data stored in a computer-based information storage system such as, for example, a RAID storage system.

2. Relevant Background

Recent years have seen a proliferation of computers and storage subsystems. Demand for storage capacity grows by over seventy-five percent each year. Early computer systems relied heavily on direct-attached storage (DAS) consisting of one or more disk drives coupled to a system bus. More recently, network-attached storage (NAS) and storage area network (SAN) technologies are used to provide storage with greater capacity, higher reliability, and higher availability. The present invention is directed primarily at network storage systems that are designed to provide shared data storage that is beyond the ability of a single host computer to efficiently manage.

To this end, mass data storage systems are implemented in networks or fabrics that provide means for communicating data with the storage systems. Host computers or servers are coupled to the network and configured with several disk drives that cumulatively provide more storage capacity or different storage functions (e.g., data protection) than could be implemented by a DAS system. In many cases, dedicated data storage systems implement much larger quantities of data storage than would be practical for a stand-alone computer or workstation. Moreover, a server dedicated to data storage can provide various degrees of redundancy and mirroring to improve access performance, availability and reliability of stored data.

However, because the physical storage disks are ultimately managed by particular servers to which they are directly attached, many of the limitations of DAS are ultimately present in conventional SAN systems. Specifically, a server has limits on how many drives it can manage as well as limits on the rate at which data can be read from and written to the physical disks that it manages. Accordingly, server-managed SAN provides distinct advantages over DAS, but continues to limit the flexibility and impose high management costs on mass storage implementation.

A significant difficulty in providing storage is not in providing the quantity of storage, but in providing that storage capacity in a manner than enables ready, reliable access with simple interfaces. Large capacity, high availability, and high reliability storage architectures typically involve complex topologies of physical storage devices and controllers. By "large capacity" it is meant storage systems having greater capacity than a single mass storage device. High reliability and high availability storage systems refer to systems that spread data across multiple physical storage systems to ameliorate risk of data loss in the event of one or more physical storage failures. Both large capacity and high availability/high reliability systems are implemented, for example, by RAID (redundant array of independent drive) systems.

Storage management tasks, which often fall on an information technology (IT) staff, often extend across multiple systems, multiple rooms within a site, and multiple sites. This physical distribution and interconnection of servers and storage subsystems is complex and expensive to deploy, maintain and manage. Essential tasks such as backing up and restoring data are often difficult and leave the computer system vulnerable to lengthy outages.

Storage consolidation is a concept of growing interest. Storage consolidation refers to various technologies and techniques for implementing mass storage as a unified, largely self-managing utility for an enterprise. By unified it is meant that the storage can be accessed using a common interface without regard to the physical implementation or redundancy configuration. By self-managing it is meant that many basic tasks such as adapting to changes in storage capacity (e.g., adding or removing drives), creating redundancy sets, and the like are performed automatically without need to reconfigure the servers and client machines accessing the consolidated storage.

Computers access mass storage capacity using a file system implemented with the computer's operating system. A file system is the general name given to the logical structures and software routines, usually closely tied to the operating system software, that are used to control access to storage. File systems implement a mapping data structure that associates addresses used by application software to addresses used by the underlying storage layers. While early file systems addressed the storage using physical information about the hard disk(s), modern file systems address logical units (LUNs) that comprise a single drive, a portion of a drive, or more than one drive.

Modern file systems issue commands to a disk controller either directly, in the case of direct attached storage, or through a network connection, in the case of network file systems. A disk controller is itself a collection of hardware and software routines that translate the file system commands expressed in logical terms into hardware-specific commands expressed in a protocol understood by the physical drives. The controller may address the disks physically, however, more commonly a controller addresses logical block addresses (LBAs). The disk drives themselves include a controller that maps the LBA requests into hardware-specific commands that identify a particular physical location on a storage media that is to be accessed.

Despite the fact that disks are addressed logically rather than physically, logical addressing does not truly "virtualize" the storage. Presently, a user (i.e., IT manager) is required to have at least some level of knowledge about the physical storage topology in order to implement, manage and use large capacity mass storage and/or to implement high reliability/high availability storage techniques. User awareness refers to the necessity for a user of the mass storage to obtain knowledge of physical storage resources and topology in order to configure controllers to achieve a desire storage performance. In contrast, personal computer technology typically does not require user awareness to connect to storage on a local area network (LAN) as simple configuration utilities allow a user to point to the LAN storage device an connect to it. In such cases, a user can be unaware of the precise physical implementation of the LAN storage, which may be implemented in multiple physical devices and may provide RAID-type data protection.

Hence, even though the storage may appear to an end-user as abstracted from the physical storage devices, in fact the storage is dependent on the physical topology of the storage devices. A need exists for systems, methods and software that effect a true separation between physical storage and the logical view of storage presented to a user. Similarly, a need exists for systems, methods and software that merge storage management functions within the storage itself.

Storage virtualization generally refers to systems that provide transparent abstraction of storage at the block level. In essence, virtualization separates out logical data access from physical data access, allowing users to create virtual disks from pools of storage that are allocated to network-coupled hosts as logical storage when needed. Virtual storage eliminates the physical one-to-one relationship between servers and storage devices. The physical disk devices and distribution of storage capacity become transparent to servers and applications.

Virtualization can be implemented at various levels within a SAN environment. These levels can be used together or independently to maximize the benefits to users. At the server level, virtualization can be implemented through software residing on the server that causes the server to behave as if it is in communication with a device type even though it is actually communicating with a virtual disk. Server-based virtualization has limited interoperability with hardware or software components. As an example of server-based storage virtualization, Compaq offers the Compaq SANworks™ Virtual Replicator.

Compaq VersaStor™ technology is an example of fabric-level virtualization. In Fabric-level virtualization, a virtualizing controller is coupled to the SAN fabric such that storage requests made by any host are handled by the controller. The controller maps requests to physical devices coupled to the fabric. Virtualization at the fabric level has advantages of greater interoperability, but is, by itself, an incomplete solution for virtualized storage. The virtualizing controller must continue to deal with the physical storage resources at a drive level. What is needed is a virtualization system that operates at a system level (i.e., within the SAN).

Storage system architecture involves two fundamental tasks: data access and storage allocation. Data is accessed by mapping an address used by the software requesting access to a particular physical location. Hence, data access requires that a data structure or memory representation of the storage system that this mapping be available for search, which typically requires that the data structure be loaded into memory of a processor managing the request. For large volumes of storage, this mapping structure can become very large. When the mapping data structure is too large for the processor's memory, it must be paged in and out of memory as needed, which results in a severe performance penalty. A need exists for a storage system architecture that enables a memory representation for large volumes of storage using limited memory so that the entire data structure can be held in memory.

Storage allocation refers to the systems and data structures that associate particular storage resources of a physical storage device (e.g., disks or portions of disks) with a particular purpose or task. Storage is typically allocated in larger quantities, called "chunks" or "clusters", than the smallest quantity of data that can be accessed by a program. Allocation is closely tied to data access because the manner in which storage is allocated determines the size of the data structure required to access the data. Hence, a need exists for a storage allocation system that allocates storage in a manner that provides efficient data structures for accessing the data.

Data security is another important consideration in storage systems. One component of ensuring data security is generating backup copies of information stored on physical media in the storage system. Traditional techniques for generating backup copies of information stored on physical media involved making a redundant copy of the information, usually on a separate storage medium such as, e.g., a magnetic tape or optical disk. These techniques raise multiple issues in large capacity storage, high availability storage systems. Foremost, traditional backup procedures may render the storage system inaccessible during the backup process, which is inconsistent with the goal of maintaining high availability. In addition, traditional backup procedures consume significant storage space, much of which may be wasted. Hence, a need exists for backup procedures that make efficient use of storage space and processing time.

SUMMARY OF THE INVENTION

In one aspect, the present invention addresses these and other needs by providing a storage system adapted to utilize logical disks. Physical storage space is divided into segments, referred to as PSEGs, which may be combined in accordance with desired redundancy rules into a logically addressable data structure referred to as a Redundant Store. A multi-level mapping structure is implemented to relate logically addressable storage space to user data stored on physical media. At one level, a Redundant Store Descriptor (RSD) structure contains metadata identifying the PSEGs on which user data "contained" by the RSD resides. At a higher level, an LMAP structure may include a plurality of entries, each of which has a pointer to an RSD "contained" by the LMAP and metadata describing whether the user data "contained" by RSD is shared with another logical disk. At an even higher level, an L2MAP corresponds to a logical disk and may include a plurality of pointers to LMAPs "contained" in the logical disk.

When a snapshot operation is executed, the user data for the target logical disk may be operationally "frozen", and a new logical disk may be created. The new logical disk is referred to as a "predecessor" logical disk ("predecessor"), and the original logical disk is referred to as the "successor" logical disk ("successor").

Advantageously, when the snapshot operation is executed, no user data need be copied from the successor logical disk to the predecessor logical disk. Instead, the mapping structures necessary for representing the predecessor logical disk are generated and a sharing relationship is established between the predecessor and the successor. Metadata may be recorded that indicates where user data for the predecessor resides on the successor. User data may be shared between the predecessor and the successor. Nevertheless, both the predecessor and the successor may remain active, i.e., both read and write I/O operations may be directed to the predecessor and successor logical disks. Data management algorithms are implemented to maintain accurate data in both the predecessor and successor logical disks.

In one aspect, the invention a method of creating a predecessor logical disk that is a snapshot of a successor logical disk. Preferably, the successor logical disk is defined by user data stored in a plurality of uniquely identifiable PSEGS and by metadata including an L2MAP having a plurality of LMAP pointers, one or more LMAPs including a plurality of RSD pointers, and one or more RDSs having a plurality of PSEG pointers. The method comprises the steps of creating a predecessor PLDMC; creating an LMAP for the predecessor logical disk; populating the LMAP for the predecessor logical disk with RSD pointers from the successor logical disk; creating an L2MAP for the predecessor logical disk; populating the L2MAP for the predecessor logical disk; populating the L2MAP for the predecessor logical disk with the LMAP pointers from the predecessor logical disk; setting share bits in the LMAPs for the predecessor logical disk and the successor logical disk to indicate that the data is being shared; and setting share bits in the successor PLDMC to indicate that the data is being shared. The steps of the method need not be performed in a particular order.

BRIEF DESCRIPTION OF THE DRAWINGS

FIG. 2 illustrates a physical view of of a networked computer environment in which the virtualized storage system in accordance with the present invention is implemented;

FIG. 3 illustrates a storage cell shown in FIG. 2 in greater detail;

DETAILED DESCRIPTION

Network and Device Architecture

The present invention generally involves a storage architecture that provides virtualized data storage at a system level, such that virtualization is implemented within a SAN. Virtualization in accordance with the present invention is implemented in a storage system controller to provide high performance, high data availability, fault tolerance, and efficient storage management. In the past, such behaviors would be implemented at the fabric or server level by, for example, hardware and software RAID controllers that would manage multiple directly attached disk drives.

In the examples used herein, the computing systems that require storage are referred to as hosts. In a typical implementation, a host is any computing system that consumes vast quantities of data storage capacity on its own behalf, or on behalf of systems coupled to the host. For example, a host may be a supercomputer processing large databases, a transaction processing server maintaining transaction records, and the like. Alternatively, the host may be a file server on a local area network (LAN) or wide area network (WAN) that provides mass storage services for an enterprise. In the past, such a host would be outfitted with one or more disk controllers or RAID controllers that would be configured to manage multiple directly attached disk drives. The host connects to the virtualized SAN in accordance with the present invention with a high-speed connection technology such as a fibre channel (FC) fabric in the particular examples. Although the host and the connection between the host and the SAN are important components of the entire system, neither the host nor the FC fabric are considered components of the SAN itself.

The present invention implements a SAN architecture comprising a group of storage cells, where each storage cell comprises a pool of storage devices called a disk group. Each storage cell comprises parallel storage controllers coupled to the disk group. The storage controllers coupled to the storage devices using a fibre channel arbitrated loop connection, or through a network such as a fibre channel fabric or the like. The storage controllers are also coupled to each other through point-to-point connections to enable them to cooperatively manage the presentation of storage capacity to computers using the storage capacity.

The present invention is illustrated and described in terms of a distributed computing environment such as an enterprise computing system using a private SAN. However, an important feature of the present invention is that it is readily scaled upwardly and downwardly to meet the needs of a particular application.

Figure 1:
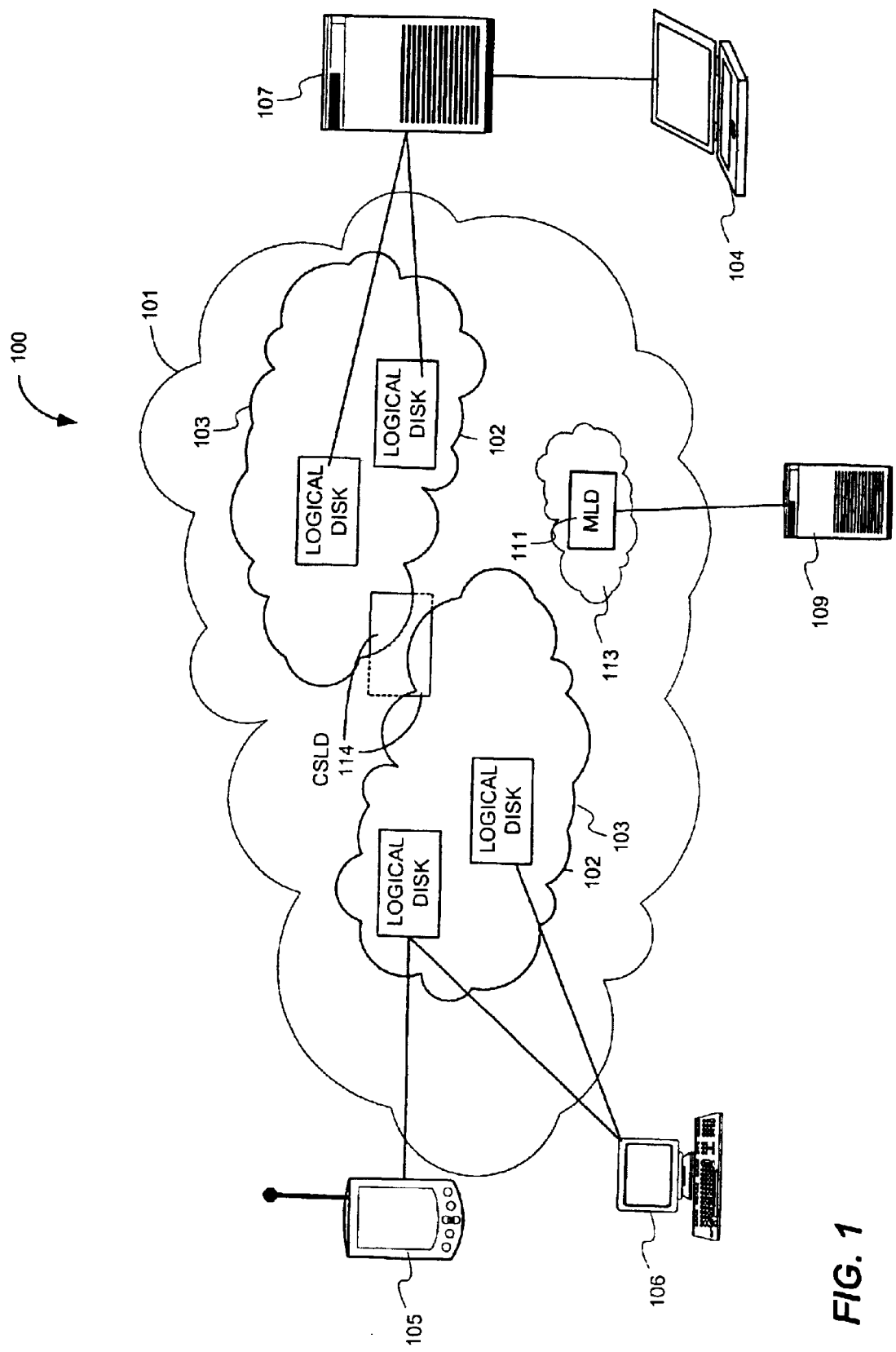
FIG. 1 shows a logical view of a networked computer environment in which the virtualized storage system in accordance with the present invention is implemented.

FIG. 1 shows a logical view of an exemplary SAN environment 100 in which the present invention may be implemented. Environment 100 shows a storage pool 101 comprising an arbitrarily large quantity of storage space from which logical disks (also called logical units or LUNs) 102 are allocated. In practice, storage pool 101 will have some finite boundaries determined by a particular hardware implementation, however, there are few theoretical limits to the size of a storage pool 101.

Within pool 101 logical device allocation domains (LDADs) 103 are defined. LDADs correspond to a set of physical storage devices from which LUNs 102 may be allocated. LUNs 102 do not span LDADs 103 in the preferred implementations. Any number of LDADs 103 may be defined for a particular implementation as the LDADs 103 operate substantially independently from each other. LUNs 102 have a unique identification within each LDAD 103 that is assigned upon creation of a LUN 102. Each LUN 102 is essential a contiguous range of logical addresses that can be addressed by host devices 105, 106, 107 and 109 by mapping requests from the connection protocol used by the hosts to the uniquely identified LUN 102.

Some hosts such as host 107 will provide services of any type to other computing or data processing systems. Devices such as client 104 may access LUNs 102 via a host such as server 107 to which they are coupled through a LAN, WAN, or the like. Server 107 might provide file services to network-connected clients, transaction processing services for a bank automated teller network, telephone call processing services and the like. Hence, client devices 104 may or may not directly use the storage consumed by host 107. It is also contemplated that devices such as computer 106 and wireless device 105, which are also hosts, may logically couple directly to LUNs 102. While the present invention is particularly directed to host systems that use large quantities of storage, it is uniquely able to provide such features as mirroring, parity protection, and striping in very small sized LUNs as well. In the past, such storage behaviors required multiple disks and so were inherently implemented with many gigabytes of storage. Hosts 105–107 may couple to multiple LUNs 102, and LUNs 102 may be shared amongst multiple hosts, although in a particular implementation each LUN 102 is presented to a specific host 105–107.

A LUN 102 comprises one or more redundant stores (RStore) which are the fundamental unit of reliable storage in the system of the present invention. An RStore comprises an ordered set of physical storage segments (PSEGs) with associated redundancy properties and is contained entirely within a single redundant store set (RSS). By analogy to conventional systems, PSEGs are analogous to disk drives and each RSS is analogous to a RAID storage set comprising a plurality of drives.

The PSEGs that implement a particular LUN 102 are spread across many, perhaps hundreds, of physical storage disks. Moreover, the physical storage capacity that a particular LUN 102 represents may be configured to implement a variety of storage types offering varying capacity, reliability and availability features. For example, some LUNs 102 may represent striped, mirrored and/or parity-protected storage. Other LUNs 102 may represent storage capacity that is configured without striping, redundancy or parity protection. As a practical consideration, the present invention limits LUNs 102 to 2 TByte capacity of any desired configuration, however, this limit can be readily extended independently of storage capacity of individual physical hard drives.

An RSS comprises a subset of physical disks in an LDAD. In preferred implementations, an RSS includes from six to eleven physical drives (which can change dynamically), and the physical drives may be of disparate capacities. Physical drives within an RSS are assigned indices (e.g., 0, 1, 2, . . . , 11) for mapping purposes. They may be further organized as pairs (i.e., adjacent odd and even indices) for RAID-1 purposes. One problem with large RAID volumes comprising many disks is that the odds of a disk failure increase significantly as more drives are added. A sixteen drive system, for example, will be twice as likely to experience a drive failure (or more critically two simultaneous drive failures), than would an eight drive system. Because data protection is spread within an RSS in accordance with the present invention, and not across multiple RSSs, a disk failure in one RSS has no effect on the availability of any other RSS. Hence, an RSS that implements data protection must suffer two drive failures within the RSS rather than two failures in the entire system. Because of the pairing in RAID-1 implementations, not only must two drives fail within a particular RSS, but a particular one of the drives within the RSS must be the second to fail (i.e. the second-to-fail drive must be paired with the first-to-fail drive). This atomization of storage sets into multiple RSSs where each RSS can be managed independently improves the performance, reliability, and availability of data throughout the system.

A SAN manager appliance 109 is coupled to a management logical disks (MLD) 111 which is a metadata container describing the logical structures used to create LUNs 102, LDADs 103, and other logical structures used by the system. A portion of the physical storage capacity available in storage pool 101 is reserved as quorum space 113 and cannot be allocated to LDADs 103, hence cannot be used to implement LUNs 102. In a particular example, each physical disk that participates in storage pool 101 has a reserved amount of capacity (e.g., the first "n" physical sectors) that are designated as quorum space 113. MLD 111 is mirrored in this quorum space of multiple physical drives and so can be accessed even if a drive fails. In a particular example, at least one physical drive is associated with each LDAD 103 includes a copy of MLD 111 (designated a "quorum drive"). SAN management appliance 109 may wish to associate information such as name strings for LDADs 103 and LUNs 102, and timestamps for object birthdates. To facilitate this behavior, the management agent uses MLD 111 to store this information as metadata. MLD 111 is created implicitly upon creation of each LDAD 103.

Quorum space 113 is used to store information including physical store ID (a unique ID for each physical drive), version control information, type (quorum/non-quorum), RSS ID (identifies to which RSS this disk belongs), RSS Offset (identifies this disk's relative position in the RSS), Storage Cell ID (identifies to which storage cell this disk belongs), PSEG size, as well as state information indicating whether the disk is a quorum disk, for example. This metadata PSEG also contains a PSEG free list for the entire physical store, probably in the form of an allocation bitmap. Additionally, quorum space 113 contains the PSEG allocation records (PSARs) for every PSEG on the physical disk. The PSAR comprises a PSAR signature, Metadata version, PSAR usage, and an indication a RSD to which this PSEG belongs.

CSLD 114 is another type of metadata container comprising logical drives that are allocated out of address space within each LDAD 103, but that, unlike LUNs 102, span multiple LDADs 103. Preferably, each LDAD 103 includes space allocated to CSLD 114. CSLD 114 holds metadata describing the logical structure of a given LDAD 103, including a primary logical disk metadata container (PLDMC) that contains an array of descriptors (called RSDMs) that describe every RStore used by each LUN 102 implemented within the LDAD 103. The CSLD 111 implements metadata that is regularly used for tasks such as disk creation, leveling, RSS merging, RSS splitting, and regeneration. This metadata includes state information for each physical disk that indicates whether the physical disk is "Normal" (i.e., operating as expected), "Missing" (i.e., unavailable), "Merging" (i.e., a missing drive that has reappeared and must be normalized before use), "Replace" (i.e., the drive is marked for removal and data must be copied to a distributed spare), and "Regen" (i.e., the drive is unavailable and requires regeneration of its data to a distributed spare).

A logical disk directory (LDDIR) data structure in CSLD 114 is a directory of all LUNs 102 in any LDAD 103. An entry in the LDDS comprises a universally unique ID (UUID) an RSD indicating the location of a Primary Logical Disk Metadata Container (PLDMC) for that LUN 102. The RSD is a pointer to the base RSDM or entry point for the corresponding LUN 102. In this manner, metadata specific to a particular LUN 102 can be accessed by indexing into the LDDIR to find the base RSDM of the particular LUN 102.

The metadata within the PLDMC (e.g., mapping structures described hereinbelow) can be loaded into memory to realize the particular LUN 102.

Hence, the present invention implements multiple forms of metadata that can be used for recovery. The CSLD 111 implements metadata that is regularly used for tasks such as disk creation, leveling, RSS merging, RSS splitting, and regeneration. The PSAR metadata held in a known location on each disk contains metadata in a more rudimentary form that is not mapped into memory, but can be accessed when needed from its known location to regenerate all metadata in the system.

Each of the devices shown in FIG. 1 may include memory, mass storage, and a degree of data processing capability sufficient to manage a network connection. The computer program devices in accordance with the present invention are implemented in the memory of the various devices shown in FIG. 1 and enabled by the data processing capability of the devices shown in FIG. 1.

To understand the scale of the present invention, it is contemplated that an individual LDAD 103 may correspond to from as few as four disk drives to as many as several thousand disk drives. In particular examples, a minimum of eight drives per LDAD is required to support RAID-1 within the LDAD 103 using four paired disks. LUNs 102 defined within an LDAD 103 may represent a few megabytes of storage or less, up to 2 TByte of storage or more. Hence, hundreds or thousands of LUNs 102 may be defined within a given LDAD 103, and thus serve a large number of storage needs. In this manner a large enterprise can be served by a single storage pool 101 providing both individual storage dedicated to each workstation in the enterprise as well as shared storage across the enterprise. Further, an enterprise may implement multiple LDADs 103 and/or multiple storage pools 101 to provide a virtually limitless storage capability. Logically, therefore, the virtual storage system in accordance with the present invention offers great flexibility in configuration and access.

FIG. 2 illustrates a physical implementation of virtualized storage in accordance with the present invention. Network 201, such as a fibre channel fabric, interconnects a plurality of storage cells 203. Storage cells 203 are accessible through fabric 201, or by management appliance 109 through LANs/WANs 207. Storage cells 203 essentially implement a storage pool 101. The number of storage cells that can be included in any SAN is primarily limited by the connectivity implemented by fabric 201. A fabric comprising even a single fibre channel switch can interconnect 256 or more ports, providing a possibility of hundreds of storage cells 203 in a single storage pool 101.

Host 213 includes adapter hardware and software to enable a connection to fabric 201. The connection to fabric 201 may be through an optical coupling or more conventional conductive cabling depending on the bandwidth requirements. A host adapter will often be implemented as a plug-in card on a host computer system. A host 213 may implement any number of host adapters to provide as many connections to fabric 213 as the hardware and software support.

As shown in FIG. 3, each storage cell 203 in the preferred embodiment comprises a pair of network storage controllers (NSCs) 301 coupled by a fibre channel arbitrated loop (FCAL) to a plurality of hard disks located in disk cabinet 303. NSC 301 implements a network interface to receive storage access requests from hosts as well as fibre channel arbitrated loop ports to connect to storage device in cabinet 303. NSCs 301 are coupled together over a high-speed connection such as a fibre channel point-to-point connection. While the particular embodiments are illustrated with fibre channel communication links, any communication protocol and hardware that provides sufficient bandwidth for a particular application may be used, including proprietary hardware and protocols.

Figure 4:
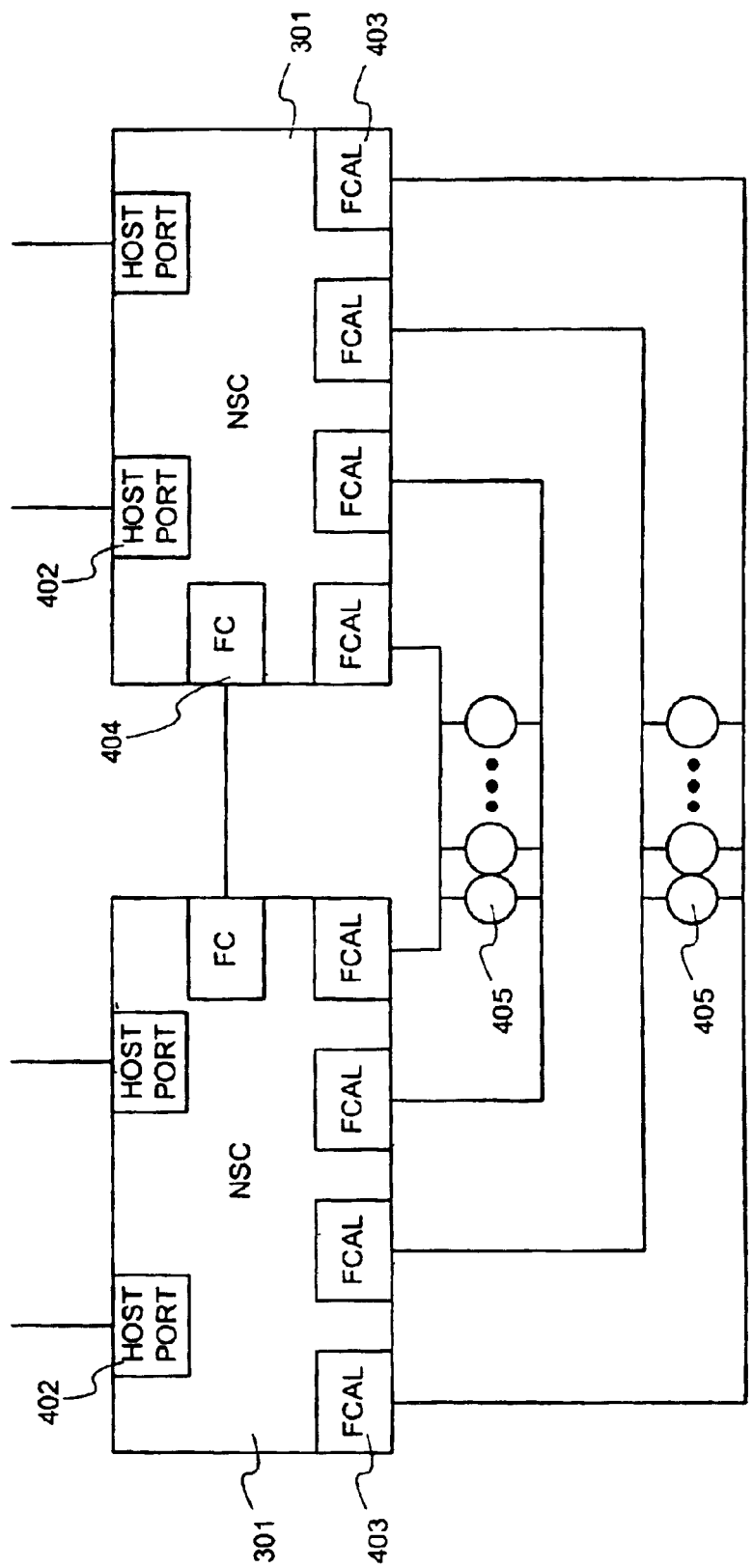
FIG. 4 shows a functional block-diagram of components of an alternative embodiment storage cell.

FIG. 4 illustrates a functional model of a storage cell 203 in greater detail. In the example of FIG. 4, storage cell 203 includes NSCs 401 to provide redundancy. NSCs 301 are implemented microcomputers having a microprocessor and memory, as well as a plurality of fibre channel ports 402, 403 and 404. Host adapter ports 402 provide an interface to fabric 201 (shown in FIG. 2) and are implemented as FC N_Ports in a particular example. Each Host adapter port handles login to fabric 201, and is assigned a fabric-unique port ID in the login process. Dual host port connections on each NSC provide redundancy.

Any number of FCAL ports 403 may be implemented in each NSC 301, although four FCAL ports 403 per NSC 401 are used in the exemplary implementation. FCAL ports 403 are used to connect to drives 405 which comprise fiber channel drives. It should be understood that a variety of configurations are possible. For example, rather than an FCAL configuration, a fibre channel fabric using a switch could be used to couple to drives 405. The particular FCAL implementation shown allows up to 120 drives in each of two FCAL loops (240 drives per storage cell 203), where each loop is accessible by either NSC 301 to provide redundant connectivity. As each drive 405 may implement from 10 GB to 100 GB or more of storage capacity, a single storage cell 203 may implement vast quantities of storage. All of the storage that is accessible through a particular pair of NSCs 403 is considered to be within the storage pool 101 in which LDADs 103 can be implemented. While a SAN may include multiple storage cells 203, each cell 203 essentially implements and independent storage pool 101.

Each disk drive 405 is represented as a plurality of equal-sized physical segments. In a particular example, each physical segment (PSEG) comprises 4096 contiguous sectors, or 2 Mbyte of storage capacity. A 20 Gbyte drive will, therefore, provide 10K PSEGs, whereas an 80 Gbyte drive will provide 80K PSEGs. By decomposing physical drives into uniform-sized atomic units (PSEGs), the system can use PSEGs in a manner akin to how prior systems used drives. Essentially, PSEGs are treated as an atomic unit of storage rather than a physical drive. Because of this, the processes that manipulate data to, for example, implement parity, mirroring, striping, leveling, failure recovery and the like operate on much smaller units (PSEGs) rather than on entire drives as was done in the past. PSEGs are allocated to a particular storage task rather than drives. This atomicity increases the granularity with which the physical storage resources can be applied to a particular task, resulting in an increased flexibility in implementation of a particular LUN 102.

Specifically, drives 405 within a given storage cell 203 may vary in capacity as the present invention includes mechanisms that efficiently use all storage capacity. Moreover, drives 405 that are involved in the implementation of a particular LUN 102 may vary in capacity while at the same time efficiently using the disk capacity. This allows great flexibility in populating drives 405 so that the most cost and performance efficient drives can be selected at any given time, and storage capacity can grow or shrink incrementally without requiring replacement of drives 405.

Figure 5:
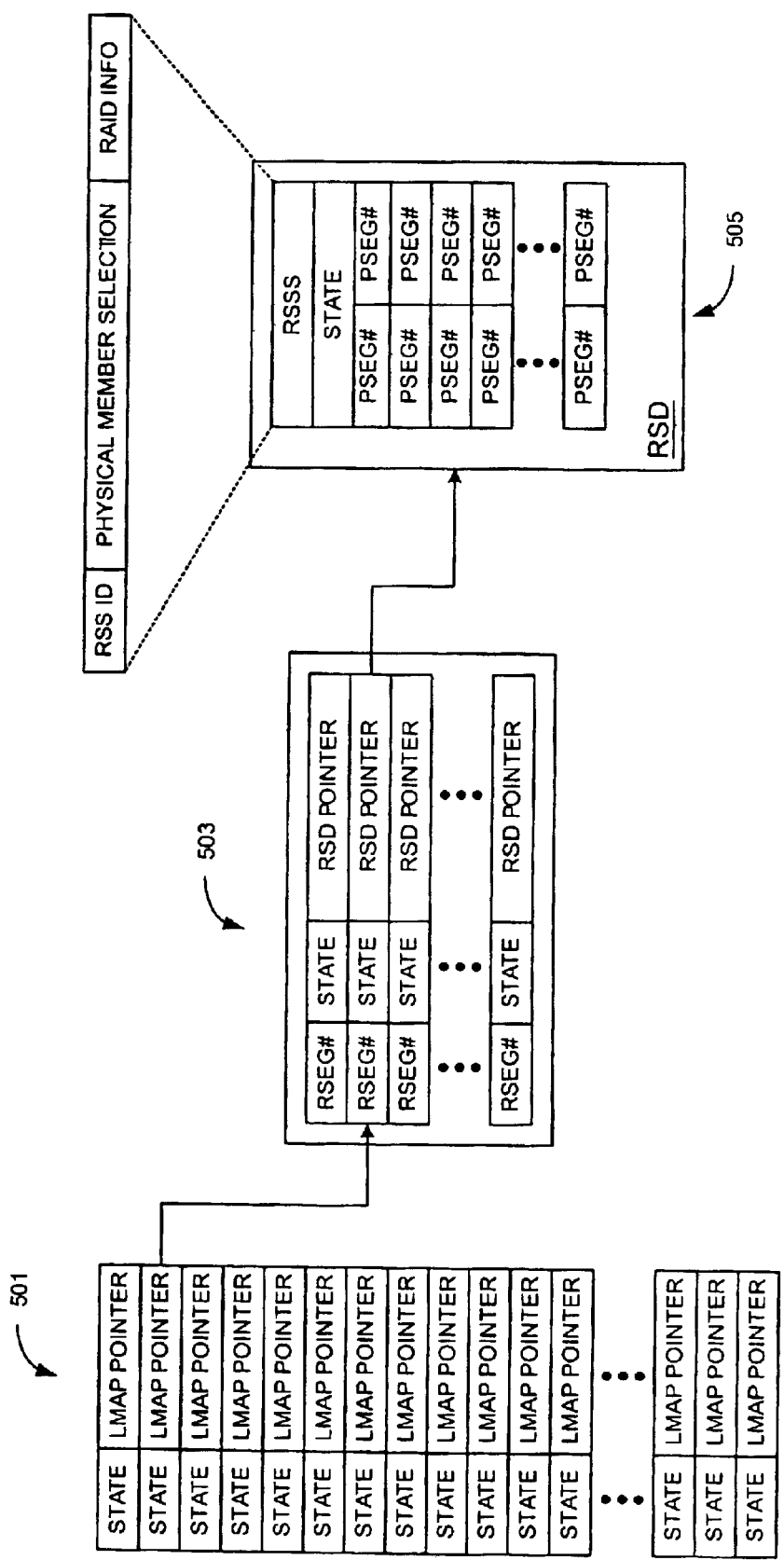
FIG. 5 depicts data structures implementing an in-memory representation of a storage system in accordance with the present invention.

Returning now to the issues of allocating storage capacity to particular tasks, FIG. 5 illustrates and exemplary memory representation of a LUN 102 in accordance with an embodiment of the present invention. A memory representation is essentially a mapping structure that is implemented in memory of a NSC 401 that enables translation of a request expressed in terms of a logical block address (LBA) from host 301 into a read/write command addressed to a particular portion of a physical disk 405 having the desired information. A memory representation desirably is small enough to fit into a reasonable amount of memory so that it can be readily accessed in operation with minimal or no requirement to page the memory representation into and out of the NSC's memory.

The memory representation of the present invention is described in terms of a system that enables each LUN 102 to implement from 1 Mbyte to 2 TByte in storage capacity. Larger storage capacities per LUN 102 are contemplated, however, for purposes of illustration a 2 Tbyte maximum is used in this description. Further, the memory representation enables each LUN 102 to be defined with any type of RAID data protection, including multi-level RAID protection, as well as supporting no redundancy at all. Moreover, multiple types of RAID data protection may be implemented within a single LUN 102 such that a first range of logical disk addresses (LDAs) correspond to unprotected data, and a second set of LDAs within the same LUN 102 implement RAID 5 protection. Hence, the data structures implementing the memory representation must be flexible to handle this variety, yet efficient such that LUNs 102 do not require excessive data structures.

A persistent copy of the memory representation shown in FIG. 5 is maintained in the PLDMDC for each LUN 102 described hereinbefore. The memory representation of a particular LUN 102 is realized when the system reads metadata contained in the quorum space 113 to obtain a pointer to the corresponding PLDMDC, then retrieves the PLDMDC and loads an level 2 map (L2MAP) 502. This is performed for every LUN 102, although in ordinary operation this would occur once when a LUN 102 was created, after which the memory representation will live in memory as it is used.

A logical disk mapping layer maps a LDA specified in a request to a specific RStore as well as an offset within the RStore. Referring to the embodiment shown in FIG. 5, the present invention is implemented using an L2MAP 501, an LMAP 503, and a redundancy set descriptor (RSD) 505 as the primary structures for mapping a logical disk address to physical storage location(s) represented by that address. The mapping structures shown in FIG. 5 are implemented for each LUN 102. A single L2MAP handles the entire LUN 102. Each LUN 102 is represented by multiple LMAPs 503 where the particular number of LMAPs 503 depend on the actual address space that is allocated at any given time. RSDs 505 also exist only for allocated storage space. Using this split directory approach, a large storage volume that is sparsely populated with allocated storage, the structure shown in FIG. 5 efficiently represents the allocated storage while minimizing data structures for unallocated storage.

L2MAP 501 includes a plurality of entries where each entry represents 2 Gbyte of address space. For a 2 Tbyte LUN 102, therefore, L2MAP 501 includes 1024 entries to cover the entire address space in the particular example. Each entry may include state information corresponding to the corresponding 2 Gbyte of storage, and a pointer a corresponding LMAP descriptor 503. The state information and pointer are only valid when the corresponding 2 Gbyte of address space have been allocated, hence, some entries in L2MAP 501 will be empty or invalid in many applications.

The address range represented by each entry in LMAP 503, is referred to as the logical disk address allocation unit (LDAAU). In the particular implementation, the LDAAU is 1 MByte. An entry is created in LMAP 503 for each allocated LDAAU irrespective of the actual utilization of storage within the LDAAU. In other words, a LUN 102 can grow or shrink in size in increments of 1 Mbyte. The LDAAU is represents the granularity with which address space within a LUN 102 can be allocated to a particular storage task.

An LMAP 503 exists only for each 2 Gbyte increment of allocated address space. If less than 2 Gbyte of storage are used in a particular LUN 102, only one LMAP 503 is required, whereas, if 2 Tbyte of storage is used, 1024 LMAPs 503 will exist. Each LMAP 503 includes a plurality of entries where each entry optionally corresponds to a redundancy segment (RSEG). An RSEG is an atomic logical unit that is roughly analogous to a PSEG in the physical domain—akin to a logical disk partition of an RStore. In a particular embodiment, an RSEG is a logical unit of storage that spans multiple PSEGs and implements a selected type of data protection. Entire RSEGs within an RStore are bound to contiguous LDAs in a preferred implementation. In order to preserve the underlying physical disk performance for sequential transfers, it is desirable to adjacently locate all RSEGs from an RStore in order, in terms of LDA space, so as to maintain physical contiguity. If, however, physical resources become scarce, it may be necessary to spread RSEGs from RStores across disjoint areas of a LUN 102. The logical disk address specified in a request 501 selects a particular entry within LMAP 503 corresponding to a particular RSEG that in turn corresponds to 1 Mbyte address space allocated to the particular RSEG#. Each LMAP entry also includes state information about the particular RSEG, and an RSD pointer.

Optionally, the RSEG#s may be omitted, which results in the RStore itself being the smallest atomic logical unit that can be allocated. Omission of the RSEG# decreases the size of the LMAP entries and allows the memory representation of a LUN 102 to demand fewer memory resources per MByte of storage. Alternatively, the RSEG size can be increased, rather than omitting the concept of RSEGs altogether, which also decreases demand for memory resources at the expense of decreased granularity of the atomic logical unit of storage. The RSEG size in proportion to the RStore can, therefore, be changed to meet the needs of a particular application.

The RSD pointer points to a specific RSD 505 that contains metadata describing the RStore in which the corresponding RSEG exists. As shown in FIG. 5, the RSD includes a redundancy storage set selector (RSSs) that includes a redundancy storage set (RSS) identification, a physical member selection, and RAID information. The physical member selection is essentially a list of the physical drives used by the RStore. The RAID information, or more generically data protection information, describes the type of data protection, if any, that is implemented in the particular RStore. Each RSD also includes a number of fields that identify particular PSEG numbers within the drives of the physical member selection that physically implement the corresponding storage capacity. Each listed PSEG# corresponds to one of the listed members in the physical member selection list of the RSSs. Any number of PSEGs may be included, however, in a particular embodiment each RSEG is implemented with between four and eight PSEGs, dictated by the RAID type implemented by the RStore.

In operation, each request for storage access specifies a LUN 102, and an address. A NSC 301 maps the logical drive specified to a particular LUN 102, then loads the L2MAP 501 for that LUN 102 into memory if it is not already present in memory. Preferably, all of the LMAPs and RSDs for the LUN 102 are loaded into memory as well. The LDA specified by the request is used to index into L2MAP 501, which in turn points to a specific one of the LMAPs. The address specified in the request is used to determine an offset into the specified LMAP such that a specific RSEG that corresponds to the request-specified address is returned. Once the RSEG# is known, the corresponding RSD is examined to identify specific PSEGs that are members of the redundancy segment, and metadata that enables a NSC 401 to generate drive specific commands to access the requested data. In this manner, an LDA is readily mapped to a set of PSEGs that must be accessed to implement a given storage request.

The L2MAP consumes 4 Kbytes per LUN 102 regardless of size in an exemplary implementation. In other words, the L2MAP includes entries covering the entire 2 Tbyte maximum address range even where only a fraction of that range is actually allocated to a LUN 102. It is contemplated that variable size L2MAPs may be used, however such an implementation would add complexity with little savings in memory. LMAP segments consume 4 bytes per Mbyte of address space while RSDs consume 3 bytes per MB. Unlike the L2MAP, LMAP segments and RSDs exist only for allocated address space.

Figure 6:
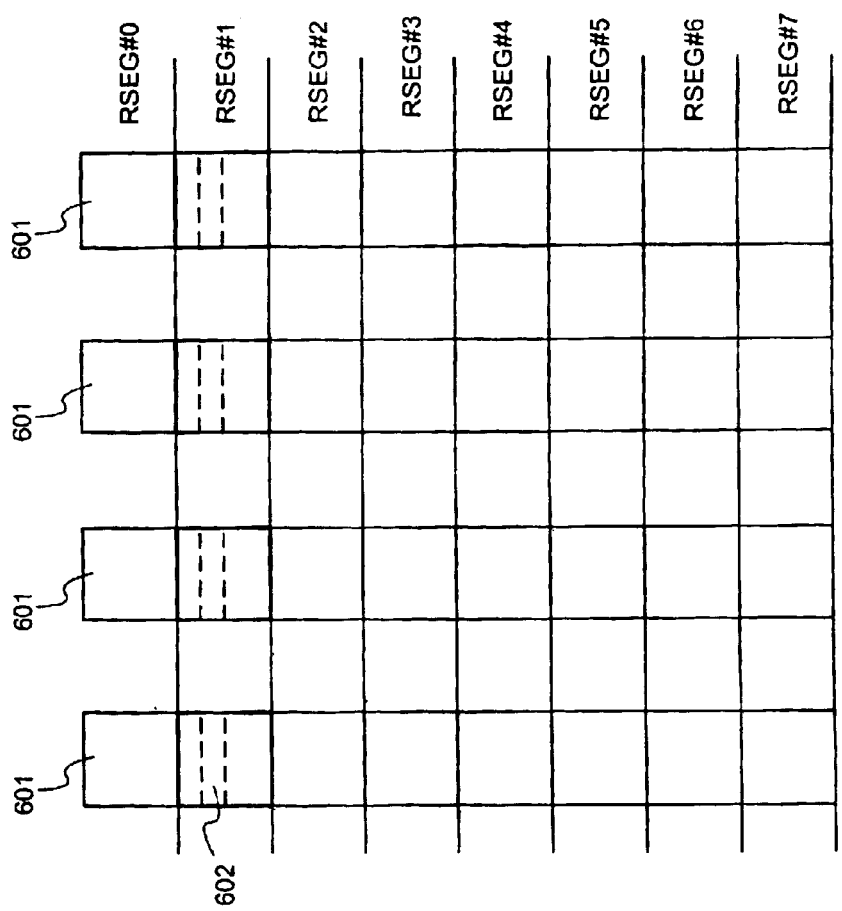
FIG. 6 illustrates atomic physical and logical data storage structures in accordance with the present invention.

As shown in FIG. 6, a redundancy layer selects PSEGs 601 based on the desired protection and subject to NSC data organization rules, and assembles them to create Redundant Stores (RStores). The set of PSEGs that correspond to a particular redundant storage set are referred to as an "RStore". Data protection rules may require that the PSEGs within an RStore are located on separate disk drives, or within separate enclosure, or at different geographic locations. Basic RAID-5 rules, for example, assume that striped data involve striping across independent drives. However, since each drive comprises multiple PSEGs, the redundancy layer of the present invention ensures that the PSEGs are selected from drives that satisfy desired data protection criteria, as well as data availability and performance criteria.

RStores are allocated in their entirety to a specific LUN 102. RStores may be partitioned into 1 Mbyte segments (RSEGs) as shown in FIG. 6. Each RSEG in FIG. 6 presents only 80% of the physical disk capacity consumed as a result of storing a chunk of parity data in accordance with RAID 5 rules. When configured as a RAID 5 storage set, each RStore will comprise data on four PSEGs, and parity information on a fifth PSEG (not shown) similar to RAID4 storage. The fifth PSEG does not contribute to the overall storage capacity of the RStore, which appears to have four PSEGs from a capacity standpoint. Across multiple RStores the parity will fall on various of various drives so that RAID 5 protection is provided.

RStores are essentially a fixed quantity (8 MByte in the examples) of virtual address space. RStores consume from four to eight PSEGs in their entirety depending on the data protection level. A striped RStore without redundancy consumes 4 PSEGs (4-2048 KByte PSEGs=8 MB), an RStore with 4+1 parity consumes 5 PSEGs and a mirrored RStore consumes eight PSEGs to implement the 8 Mbyte of virtual address space.

An RStore is analogous to a RAID disk set, differing in that it comprises PSEGs rather than physical disks. An RStore is smaller than conventional RAID storage volumes, and so a given LUN 102 will comprise multiple RStores as opposed to a single RAID storage volume in conventional systems.

It is contemplated that drives 405 may be added and removed from an LDAD 103 over time. Adding drives means existing data can be spread out over more drives while removing drives means that existing data must be migrated from the exiting drive to fill capacity on the remaining drives. This migration of data is referred to generally as "leveling". Leveling attempts to spread data for a given LUN 102 over as many physical drives as possible. The basic purpose of leveling is to distribute the physical allocation of storage represented by each LUN 102 such that the usage for a given logical disk on a given physical disk is proportional to the contribution of that physical volume to the total amount of physical storage available for allocation to a given logical disk.

Existing RStores can be modified to use the new PSEGs by copying data from one PSEG to another and then changing the data in the appropriate RSD to indicate the new membership. Subsequent RStores that are created in the RSS will use the new members automatically. Similarly, PSEGs can be removed by copying data from populated PSEGs to empty PSEGs and changing the data in LMAP 502 to reflect the new PSEG constituents of the RSD. In this manner, the relationship between physical storage and logical presentation of the storage can be continuously managed and updated to reflect current storage environment in a manner that is invisible to users.

Figure 7:
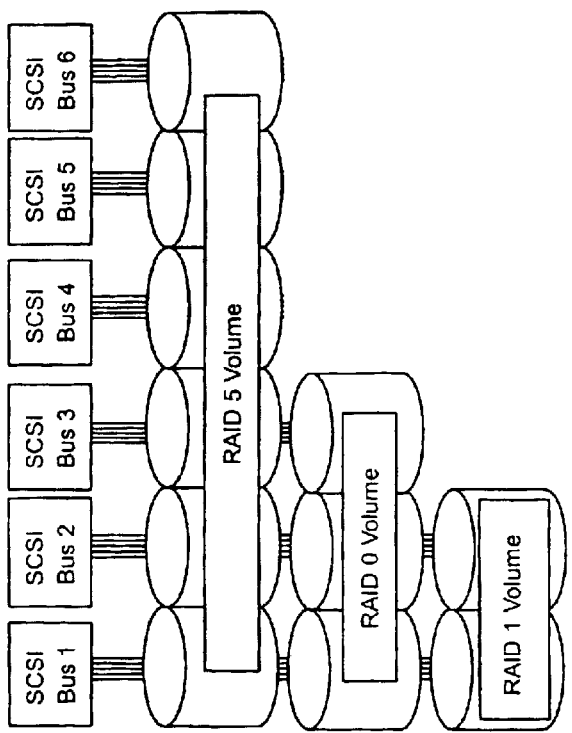
FIG. 7 shows a prior art storage system implementing multiple types of data protection.

The effect of atomization of the storage capacity into PSEGs and RSEGs is apparent in an implementation with multiple volumes of different RAID configuration shown in FIG. 7. In a conventional system, a first controller manages a RAID-5 volume spreading data and parity over several physical disks to provide data protection. A second controller is used to implement RAID-level 0 striping to improve write performance without data protection. Yet a third controller may be used to provide mirroring through RAID-1 mechanisms. The physical disk resources are deployed inefficiently, and configuration and management of the array is complex and problematic. Management of any given volume is highly dependent on the capacity and performance of the disk drives that make up that volume.

Figure 8:
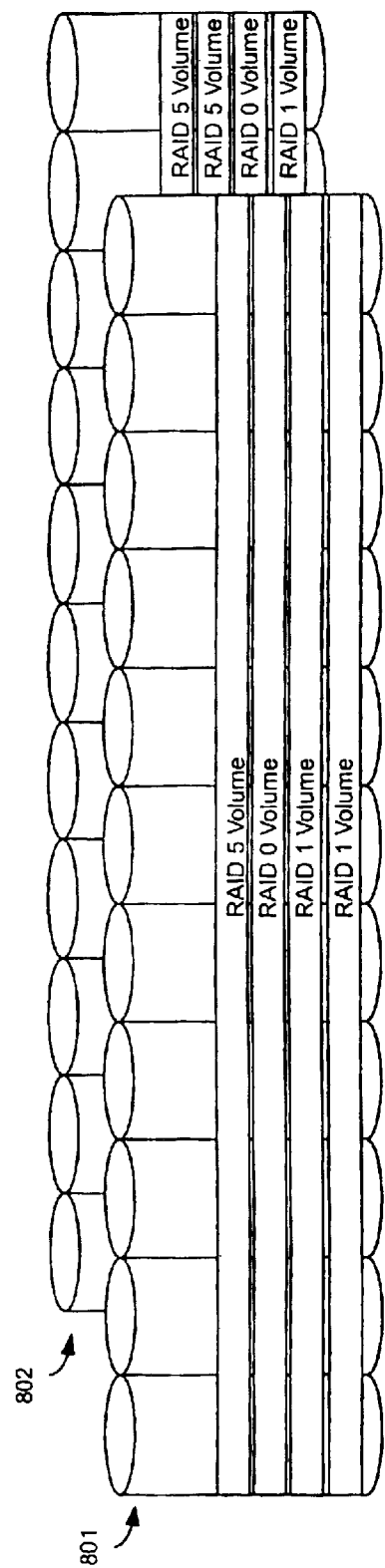
FIG. 8 shows a storage system in accordance with the present invention implementing multiple types of data protection.

In contrast, the present invention divides the disks into a plurality of PSEGs and forms volumes from any of the available PSEGs. As illustrated in FIG. 8, PSEGS from each of the total pool of physical drives may participate in any or all of the storage volumes despite the volumes having different RAID characteristics. LDAD 801 implements a RAID 5, RAID 0, and two RAID 1 LUNS, with LDAD 802 implementing two RAID 5, a RAID 0, and RAID 1 volume to implement storage of equivalent protection to that shown in FIG. 7. However, the implementation of FIG. 8 spreads the data evenly over all disks in the LDADs 801 and 802.

This is further apparent in multilevel or nested RAID level implementations. In conventional systems, a sophisticated controller may implement, for example, RAID 50 by combining the block striping an parity of RAID 5 with the straight block striping of RAID 0. These nested systems have very rigid requirements for the number of disks that must participate in a storage set. For example, the number of drives must be able to be factored into two integers, one of which must be 2 or higher and the other 3 or higher (i.e., a RAID 50 set can be made from 6 drives, but not 7). These constraints, as well as increased importance for all drives to have the same physical size, greatly constrain building, growing, and shrinking the capacity of a given LUN 102.

A six drive RAID 50 volume, for example, cannot be reduced in size without replacing all of the drives with smaller drives. To increase size, two entire drives must be added, making the incremental increase in storage capacity in the order of tens of Gbytes in most cases. Also, it is often difficult to find drives matching capacity of the existing drives in a RAID 50 array. Hence, the increment may be implemented with larger capacity drives and the resulting excess capacity simply wasted.

In contrast, by using the atomic logical structure of an RStore/RSEG, the present invention shown in FIG. 8 can readily form a nested RAID set using, for example, increments of RStores rather than increments of six drives. Since all RStores are by definition the same size, the combination will be efficient. Because RStores are much smaller than typical drives, the granularity with which capacity can be added and removed from a LUN 102 is greatly improved. A LUN 102 can be incremented by adding an RStore and consume as little as 8 Mbyte of additional capacity. More significantly, the new capacity can be implemented from unallocated PSEGs in the storage pool such that there typically is no need to actually install drives. Hence, the capacity can be added (or reduced) "on-the-fly".

The use of PSEGs to form RStores is not unconstrained. RAID data mapping typically requires that the PSEGs be located on different physical drives to provide the expected data protection. For example, parity data protection provides a method of recovering from a single drive failure. However, if two PSEGs of an RStore were located on a single drive, a failure of that drive would be tantamount to two drive failures, and would not be recoverable using only parity protection.

Snapshot

Data security is an important management function in storage systems. One component of ensuring data security is generating backup copies of information stored on physical media in the storage system. In an exemplary embodiment, the present invention supports two modes of generating copies of Logical Disks: a snapshot mode and a snapclone mode. A snapshot operation is intended to provide a non-permanent copy of a logical disk to facilitate user activities such as archiving data. A snapshot operation generates a substantially instantaneous (in terms of user I/Os), space efficient, well performing, readable/writeable copy of a logical disk. A snapclone operation is intended to provide a permanent copy of a logical disk for normal, interactive use. Like a snapshot operation, a snapclone operation provides a substantially instantaneous (in terms of user I/Os), readable/writeable copy of a logical disk. For clarity, the term "snapshot" will be used to refer to both snapshot and snapclone modes where appropriate.

In summary, when a snapshot operation is executed, the user data for a given logical disk is operationally "frozen", and a new logical disk is created. The new logical disk is referred to as a "predecessor logical disk" ("predecessor"), and the original logical disk is referred to as the "successor logical disk" ("successor"). When a snapshot operation is executed, no user data need be copied. Instead, a sharing relationship is created between the predecessor and the successor. Metadata is recorded that indicates user data for the predecessor resides on the successor.

The present invention supports a space-inefficient snapshot and a space-efficient snapshot. In a space-efficient snapshot, the system reserves sufficient PSEGs to fully allocate the space that the snapshot logical disk would require. By contrast, a space-inefficient snapshot allocates PSEGs as needed to effect write operations. If sufficient PSEGs are not available, the snapshot operation may be terminated and the snapshot lost. Snapclones are space-inefficient.

A method for generating a snapshot of a virtual disk in accordance with one embodiment of the present invention will be illustrated with reference to FIG. 9. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 9:
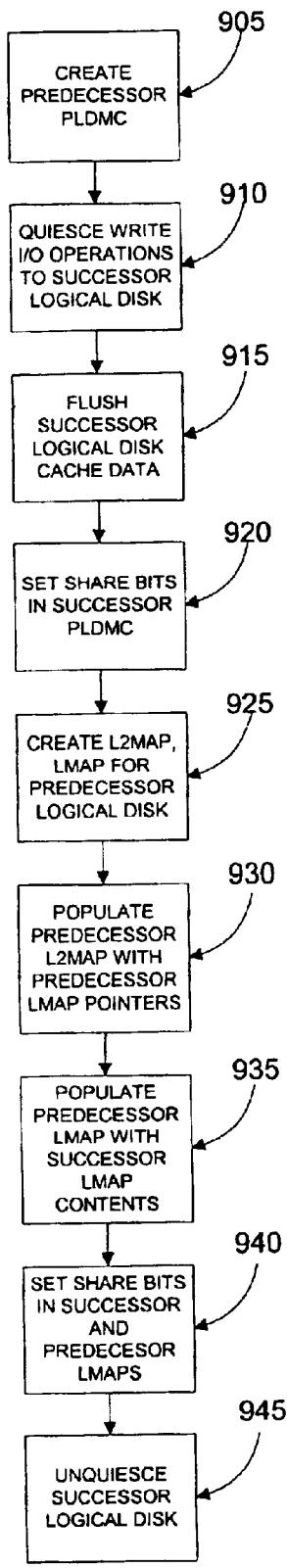
FIG. 9 is a flowchart illustrating steps in a method for creating a snapshot logical disk accessible.

Referring to FIG. 9, at step 905 a PLDMC is created for the predecessor logical disk. At step 910 write operations to the successor logical disk are quiesced. At step 915 the successor logical disk cache data is flushed. At step 920 the share bits in the successor PLDMC are set. At step 925 an L2MAP structure and an LMAP structure(s) are created for the predecessor logical disk. The L2MAP structure and LMAP structure(s) may be stored in suitable memory.

At step 930 the predecessor L2MAP is populated with pointers to the predecessor LMAP records. At step 935 the predecessor logical disk LMAP(s) are populated with the contents of the successor logical disk LMAP(s). Thus, the RSD pointer field of the predecessor logical disk LMAP points to the same RSD (and hence to the same physical media) as the RSD pointer field of the successor logical disk. In addition, at step 940 the "share" bits are set in both the successor LMAP and the predecessor LMAP to indicate that the underlying data represented by the LMAP is being shared.

In one embodiment, the present invention is adapted to enable generating multiple generations of snapshots of a logical disk, also referred to as "stacked" shapshots. To accomplish this, the invention implements a mapping process that enables sharing of data between multiple generations of snapshots. This embodiment may be implemented using an alternate mapping scheme in which each LMAP entry represents 8 MB of memory, corresponding to eight 1 MB segments, or RSEGS. Each LMAP may include eight "summary" share bits (one for each segment) which indicate whether the data in the segment is shared with a Predecessor, Successor, or both. Each RSD contains sixteen share bits: eight $S_p$ share bits (one for each segment) that indicate whether the segment is shared with a predecessor, and eight $S_s$ bits (one for each segment) that indicate whether the segment is shared with a successor. Thus, when a snapshot operation is executed, the Ss bits of the predecessor logical disk are set to indicate that the data segment represented by the predecessor LMAP entry is shared with a successor logical disk. Similarly, the Sp bits of the successor logical disk are set to indicate that the data segment represented by the successor LMAP entry is shared with a predecessor logical disk.

At step 945 the successor logical disk is unquiesced. It will be appreciated that many of the steps 905–945 need not be performed in any particular sequence.

A predecessor logical disk is available for I/O operations. Read I/Os to a predecessor logical disk are trivial. If the predecessor LMAP is structured such that an LMAP entry uniquely identifies a memory segment, as depicted in FIG. 5, then reading a predecessor logical disk simply requires reading the data indicated by the RSD pointer. However, if the predecessor LMAP does not uniquely identify a memory segment, then successor links must be traversed to locate the logical disk that contains the user data. This process is illustrated by example in FIG. 10.

Figure 10:
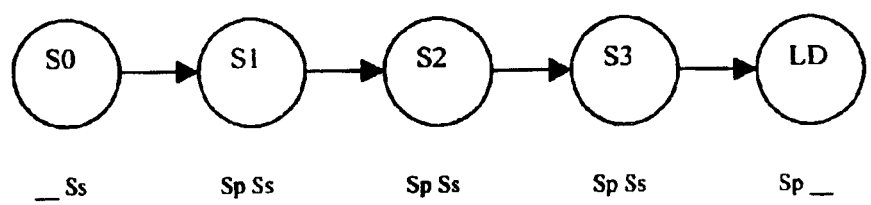
FIG. 10 is a schematic diagram illustrating a plurality of snapshot logical disks and the sharing relationships between them.

Referring to FIG. 10, assume a logical disk LD had a series of Snapshots taken over time, S0 at t0, S1 at t1, S2 at t2, S3 at t3. The Share bits (SBits) for a given segment are represented in FIG. 10. Thus, the predecessor share bit Sp in logical disk LD is set, indicating that its contents are shared with its predecessor disk S3. The successor SBit Ss (S3.Ss) is set indicating its data is shared with its successor LD, and the predecessor SBit Sp of successor disk S3 (S3.Sp) is set, indicating its data is shared with its predecessor logical disk S2. The SBits of the rest of the logical disks in the stack are set in a similar fashion. The sequence (or linked list) of logical disks that share data form a sharing tree. The SBits in each logical disk in the sharing tree describe which segments are shared between logical disks in the sharing tree.

To execute a read I/O to a logical disk in the stack, successor disks in the sharing tree are traversed until the Ss SBit of a logical disk is clear. This logical disk will point to the correct segment. By way of example, a read I/O directed to any logical disk depicted in FIG. 10 would traverse the sharing tree to logical disk LD, which would be the first logical disk encountered in which the Ss SBit is clear. The user data is contained in LD.

Write I/Os are slightly more complicated. Data consistency must be maintained when write operations are directed to either the predecessor logical disk or its successor logical disk. In one aspect, the present invention employs a "copy on first write" (CFW) routine to preserve predecessor data when write operations are directed to the predecessor or successor logical disks. In an exemplary embodiment, data is copied in fixed sized blocks independent of the actual size of a given write operation. After the data is copied, the sharing relationship between the predecessor and successor disks for the copied segment is broken.

Figure 11A:
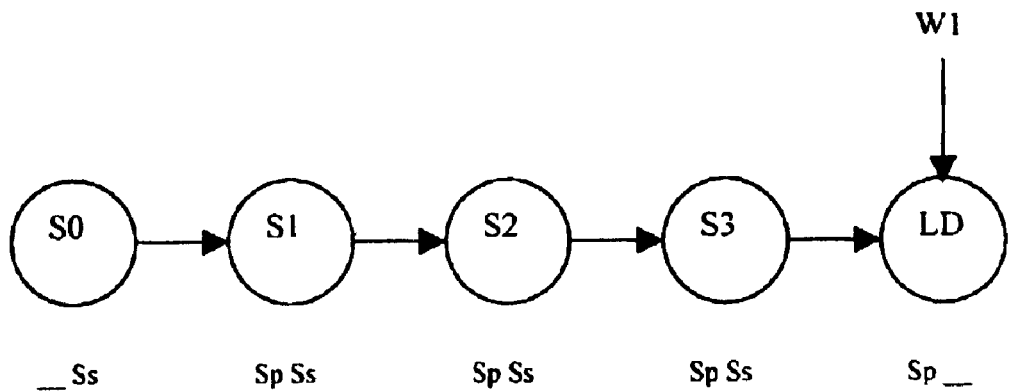
FIGS. 11a–11c are schematic diagrams illustrating a write operation directed to a logical disk.
Figure 11B:
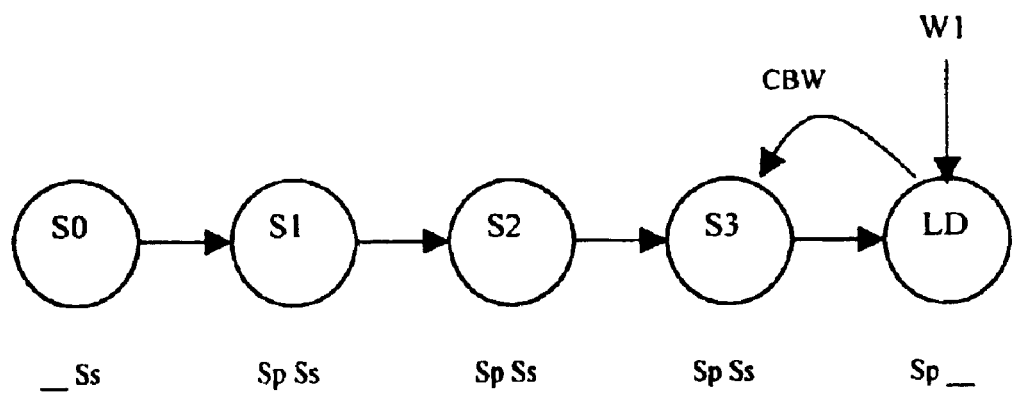
Figure 11C:
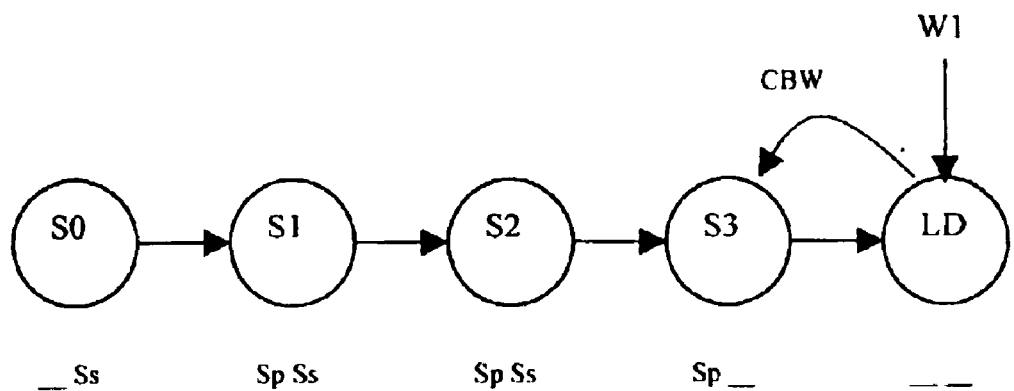

Write I/Os are illustrated schematically in FIGS. 11a–11c and 12a–12c. Referring first to FIG. 11a, assume a write operation W1 is directed to logical disk LD. The segment targeted by write operation W1 is shared (LD.Sp is set). The data for the segment must be unshared in LD before the Write can be performed. First, the data must be copied from LD to S3 (FIG. 11b). Then the sharing relationship for this segment between LD and S3 is terminated, e.g., by clearing the share bits that define the sharing relationship between LD and S3 (FIG. 11c).

Figure 12A:
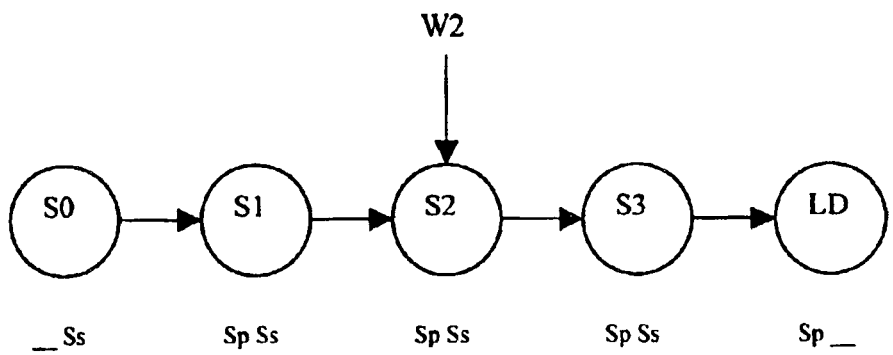
FIGS. 12a–12c are schematic diagrams illustrating a write operation directed to a logical disk.
Figure 12B:
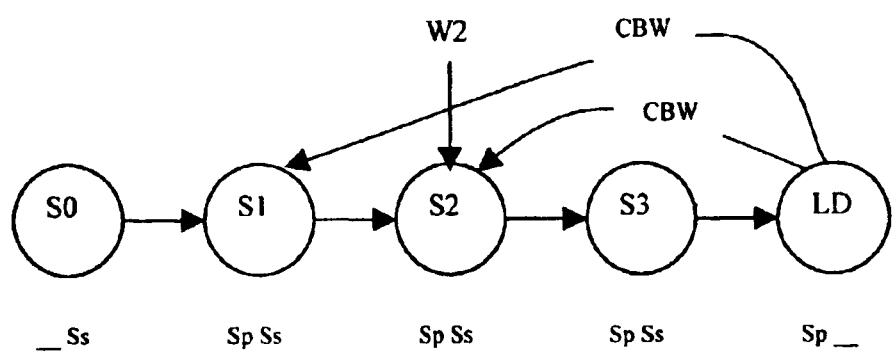
Figure 12C:
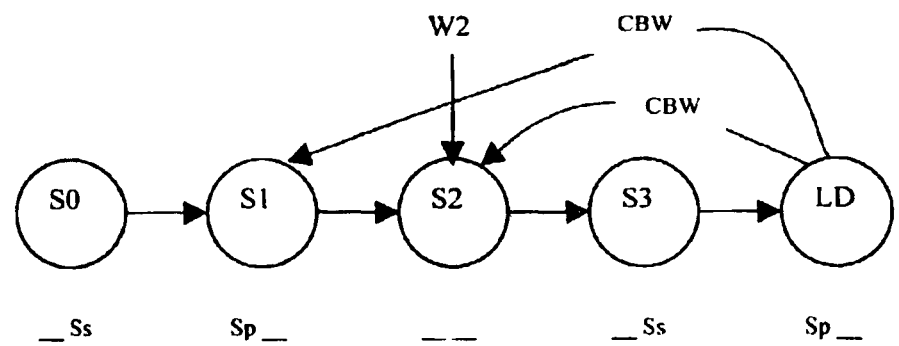

Write I/O operations directed to a logical disk that has both a predecessor disk and a successor disk require additional operations. FIGS. 12a–12c provide an example of such a write I/O operation. Referring to FIG. 12a, assume a write I/O operation is directed to logical disk S2. The segment targeted by the write I/O is shared (S2.Sp and S2.Ss are set). Therefore, the data for the segment must be completely unshared in S2 before the Write can be performed. Note that in this case, the target logical disk S2 doesn't contain the data. Therefore, the segment must first be copied in to S2. The segment to be copied is located using the same algorithm described to perform a read I/O, i.e., by traversing successor links until a clear Ss bit is located, which is the logical disk LD in this case. So the segment will be copied from LD to S2. However, this will not completely unshared the data in S2 because it still has a sharing relationship with its Predecessor, S1. So the segment will also need to be copied to S1 to completely unshared the segment in S2. First the data is copied (FIG. 12b), then the sharing relationship is broken by clearing the sharing bits that define a sharing relationship between S2 and S1, and S2 and S3.

In one aspect, the difference between a Snapclone operation and a Snapshot operation is that a Snapclone operation's data is proactively unshared by a background process as well as unshared by the CFW mechanism as a result of a Write I/O. At the completion of the unsharing, the Snapclone becomes a fully independent, unencumbered LDisk with no sharing relationships.

There are two reasons for copying data into a Snapclone logical disk: 1) in response to a Write I/O via the CFW mechanism and 2) because of the background process proactively unsharing the Snapclone's data. This background copy process will be referred to as a BGCopy mechanism. Unlike logical disks generated by a snapshot operation, logical disks generated by a snapclone operation will eventually be completely removed from the sharing tree in which it resides. This fact affects the treatment of SBits as well as the number of data copies required for CFWs. This may be illustrated by examining samples of how SBits are treated differently in a BGCopy.

Figure 13A:
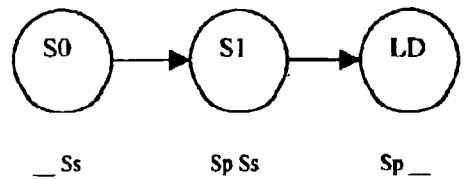
FIGS. 13a–13i are schematic diagrams illustrating aspects of a first exemplary snapclone operation.
Figure 13B:
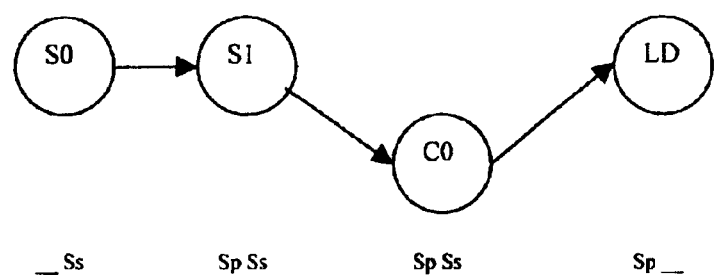
Figure 13C:
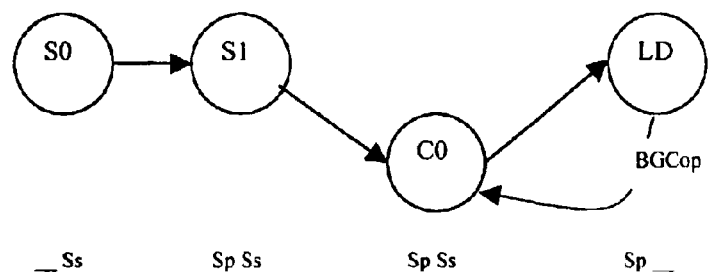

FIG. 13a illustrates a sharing tree between three logical disks LD, S1, and S0. In FIG. 13b, a snapclone operation is executed, resulting in a snapclone logical disk C0 (FIG. 13b) that maintains a sharing relationship with its successor disk LD and its predecessor disk S1. Next, a BCCopy operation is executed, copying the contents of successor disk LD to snapclone disk C0 (FIG. 13c).

Figure 13D:
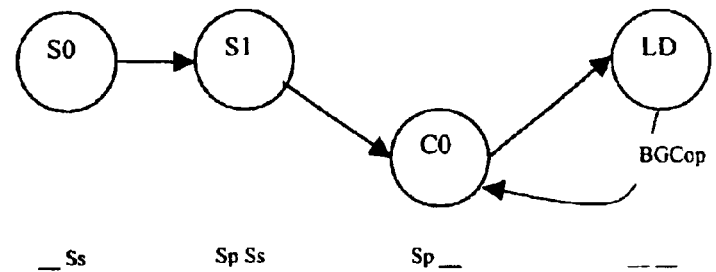

After the BGCopy, C0 and LD no longer share the represented segment. At first glance, it might seem natural to clear the SBits C0.Ss and LD.Sp (FIG. 13d). However, the sharing relationship between C0 and LD must be maintained because C0 will eventually be removed from the sharing tree. Destroying the sharing relationship between C0 and LD can cause the sharing tree to become ineffective after C0 is removed. This can be illustrated with reference to FIG. 13d. Assume that after the BGCopy the sharing bits C0.Ss and LD.Sp are cleared. Next a write I/O operation destined for this segment in LD arrives and since LD.Sp is not set, no CFW is performed. LD now has new data, and C0 has the preserved data. But upon completion of unsharing C0, C0 is removed from the tree, at which point the preserved data for this segment (which S1 should have access to) is no longer available in this sharing tree. This results in data corruption for S1 and all Predecessors. There are many variations of this problem.

Figure 13E:
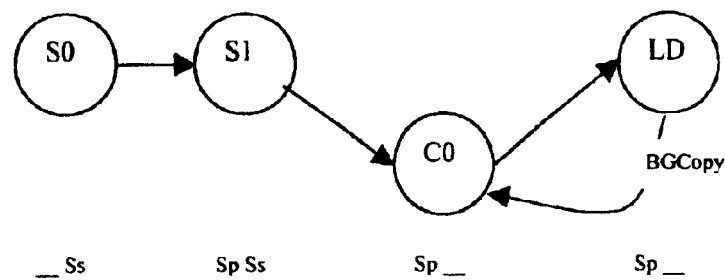
Figure 13F:
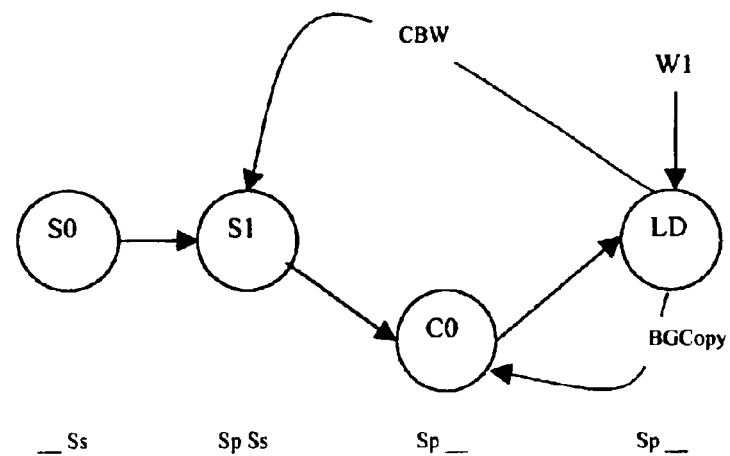
Figure 13G:
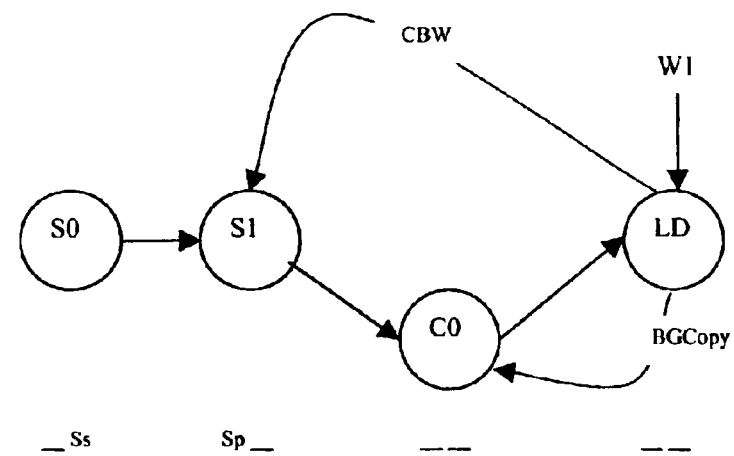
Figure 13H:
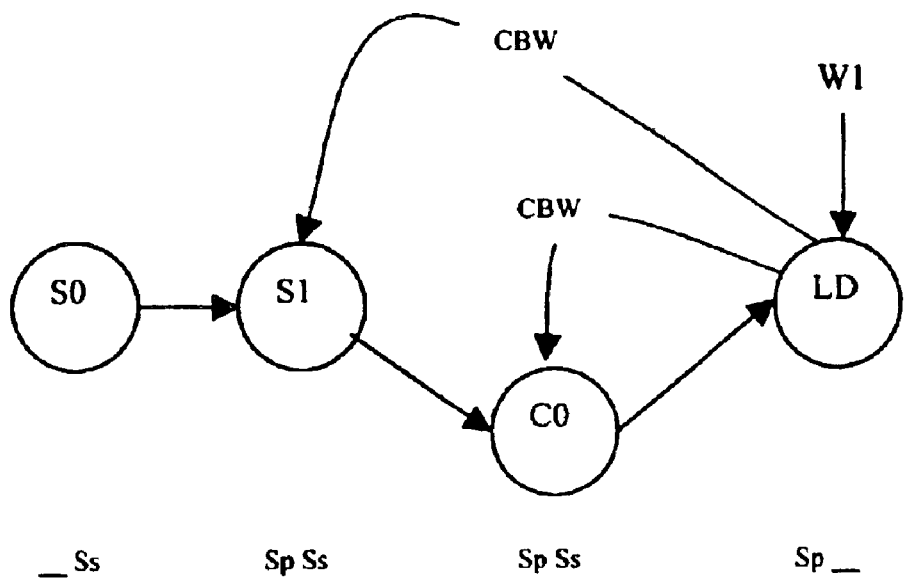
Figure 13I:
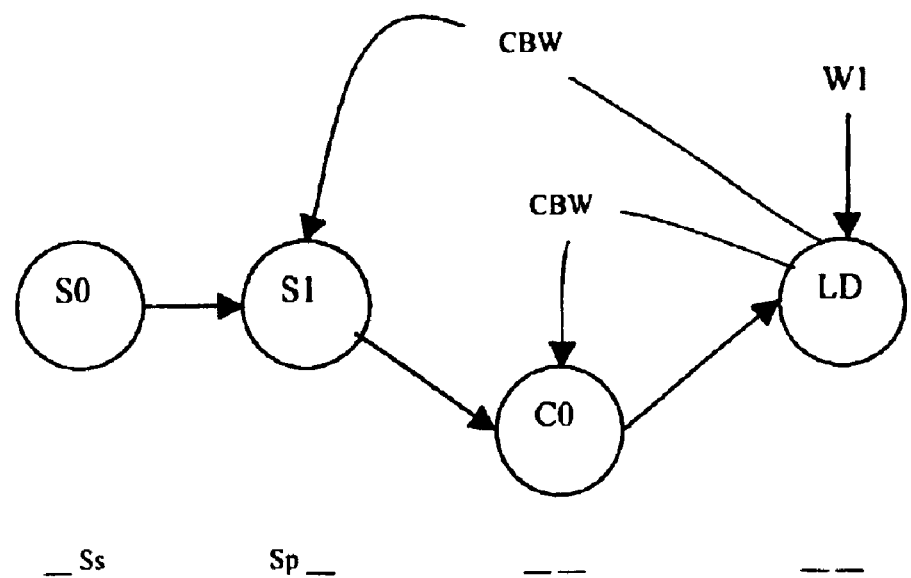

To avoid this problem, after a BGCopy operation is executed the C0.Ss bit is cleared and the LD.Sp bit is set (FIG. 13e). Now, if a write operation that affects the relevant segment in LD is executed, a CFW will be performed. However, the CFW algorithm is modified slightly when the destination of a CFW is a Snapclone. If the destination of a potential CFW operation is a Snapclone, then the data is also copied to the Snapclone's Predecessor. In this case, C0 is the destination of the CFW, and, since C0 is a Snapclone, the data is also copied to C0's Predecessor S1 (FIG. 13f). After the data is copied, the sharing relationship between C0 and LD and between C0 and S1 may be terminated (FIG. 13g). Optionally, a CFW operation may be executed, copying the target segment(s) from LD to C0 (FIG. 13h). It will be noted that executing a CFW operation is unnecessary because the BGCopy operation already copied the segment from LD to C0. However, executing a CFW command takes minimal time and automatically eliminates the sharing relationship between LD and C0, as illustrated in FIG. 13i.

Figure 14A:
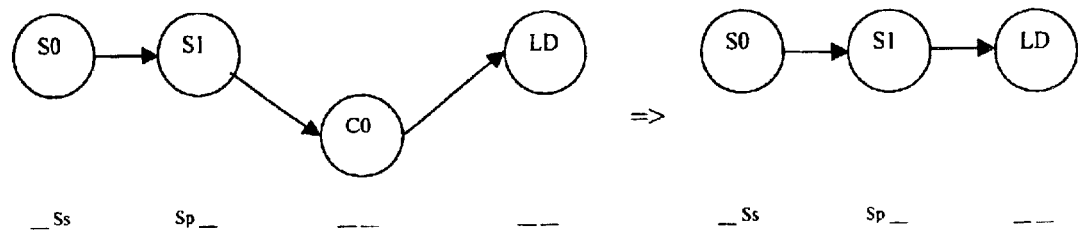
FIGS. 14a–14c are schematic diagrams illustrating aspects of removing a snapclone logical disk from a sharing tree.
Figure 14B:
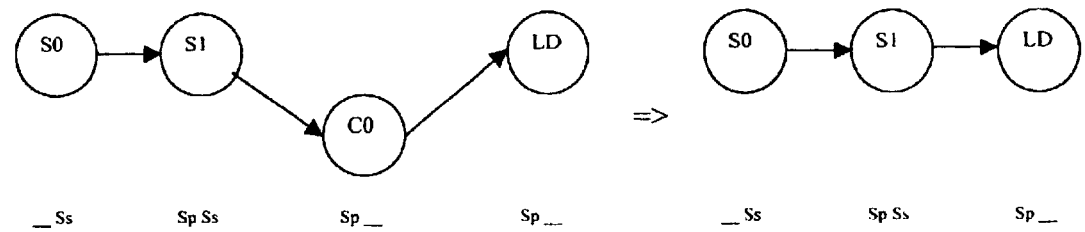
Figure 14C:
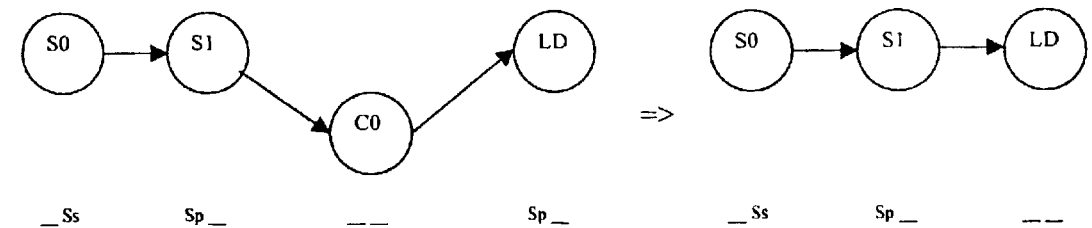

After the sharing relationship between LD and C0 is broken, the snapshot logical disk C0 may be removed from the sharing tree. When the snapshot logical disk C0 is removed from the sharing tree, some SBit management LD may be required. If LD.Sp is not set, then no Sbit management is required (FIG. 14a). By contrast, if LD.Sp is set, then the snapshot logical disk C0's Predecessor must be evaluated. If C0 has no Predecessor, then LD.Sp must be cleared. If C0's Predecessor is a Snapclone, LD.Sp must remain set. If C0's predecessor is not a Snapclone, then LD.Sp should inherit the sense of the C0's Predecessor's Ss bit (or C0's Sp bit, which will be the same) (FIGS. 14a, 14b).

Figure 15A:
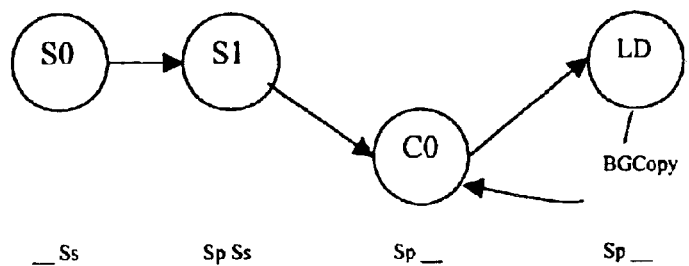
FIGS. 15a–15d are schematic diagrams illustrating aspects of a second exemplary snapclone operation.
Figure 15B:
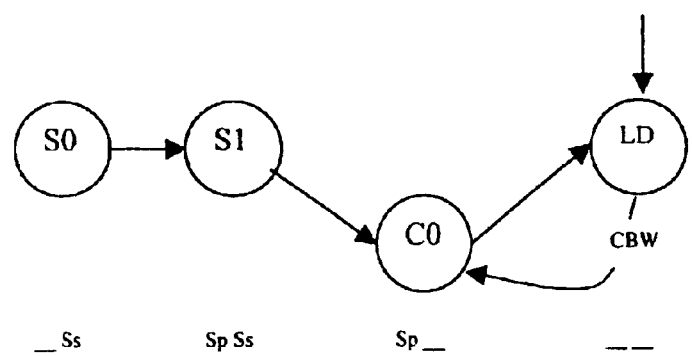

In another embodiment, the invention implements a scaling approach to managing the sharing relationships between logical disks. The scaling approach is illustrated in FIGS. 15a–15d. Referring to FIG. 15a, the BGCopy operation remains substantially the same as described above. After the BGCopy operation, the Ss bit for snapclone logical disk C0 (C0.Ss) is cleared and the Sp bit for logical disk LD (LD.Sp) remains set (FIG. 15a). Similarly, the write I/O and CFW operation is as a conventional snapshot CFW operation, as described above. Accordingly, at most two data copies will be generated for a write initiated CFW (FIG. 15b).

Figure 15C:
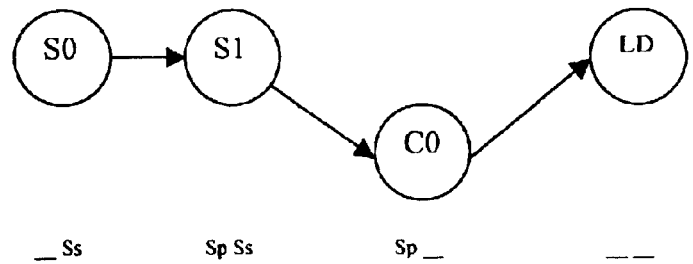

In the scaling approach, when the sharing relationship between snapclone logical disk C0 and logical disk LD has been broken, a new background process will be started to copy from C0 to S1 any data which needs to be contained by S1 after the removal of C0. Segments that will need to be copied to S1 before the remove of C0 are ones that have changed in C0's Successor (LD in this case), and have been preserved in C0, but not S1. FIG. 15c illustrates one example of the share bit pattern in logical disks S1 and C0 for segments that need to be copied.

Figure 15D:
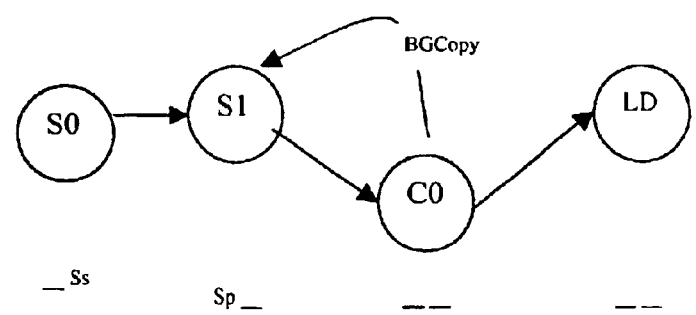

The BGCopy operation is illustrated in FIG. 15d. Initially, it will be apparent that if the snapclone logical disk C0 has no predecessor, then it is not necessary to generate copies of the data. However, if snapclone logical disk C0 has a predecessor, then the BGCopy operation executes in accordance with the following logic instructions. Initially, determine how many segments need to be copied. If the number of segments is less than a threshold M, then quiesce logical disk C0 and its successor logical disk LD. The predetermined threshold M may be determined, e.g., as a function of the time required to copy data segments. The threshold M may be predetermined (e.g., set by system designers) or may be input as a parameter by system operators (e.g., information technology managers). Next, all data segments that need to be copied are copied. If C0 and LD were quiesced during the copy operation, then C0 may be removed from the sharing tree. By contrast, if C0 and LD were not quiesced during the copy operation, then the BGCopy operation is repeated.

The BGCopy logic set forth in the preceding paragraph ensures that no write I/O operations take place during the "final" BGCopy operation. The threshold M may be set to minimize the amount of time the quiesce order would be outstanding while allowing a reasonable amount of time to finish the process of removing the snapclone disk from the sharing tree.

The present invention is particularly described in terms of a set of algorithms embodied as firmware running on storage controller hardware. These mechanisms are used to create and present virtual storage devices, i.e., LDs 102, to an arbitrary set of hosts connected to the storage controller via a network connection such as a LAN, WAN, or connection directly to the storage area network (SAN) to which the physical storage devices are connected. Users request various operations via a graphical user interface (GUI) communicating using a collection of public and private protocols. In response to user requests, the storage system automatically maps storage between memory representations and on-disk media, levels data storage across both logical and physical storage structures, and quantifies storage capacity as well as allocation patterns. The present invention atomizes storage capacity in the physical domain in the form of PSEGs and in the logical domain in the form of RStores to enable fluid movement of capacity. The relationship of particular disks can be modified to provide various levels of protection and allow for construction of virtual disks with variable levels of data protection.

The atomization of storage in the form of PSEGs coupled with a metadata directory structure that includes RDSs, LMAPs, and an L2MAP for each LD permits near instantaneous generation of shapshot logical drives. In addition, the introduction of an L2MAP structure provides efficiency advantages in data management operations. For example, if the RSD is changed after the snapshot is created (for example, if the user data is moved), then the RSD will be updated to reflect the change. However, this change is transparent to the L2MAP and the LMAP. The higher level data maps (e.g., the LMAPs and the L2MAPs) need not be updated.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of creating a predecessor logical disk that is a snapshot of a successor logical disk, wherein the successor logical disk is defined by user data stored in a plurality of uniquely identifiable PSEGS and by metadata including an L2MAP having a plurality of LMAP pointers, one or more LMAPs including a plurality of RSD pointers, and one or more RSDs having a plurality of PSEG pointers, comprising the steps of:

creating a predecessor PLDMC;

creating one or more LMAPs for the predecessor logical disk;

populating the one or more LMAPs for the predecessor logical disk with RSD pointers from one or more LMAPs associated with the successor logical disk;

creating an L2MAP for the predecessor logical disk;

populating the L2MAP for the predecessor logical disk with one or more pointers to one or more precessor LMAP records;

setting one or more share bits in the one or more LMAPs for the predecessor logical disk and the successor logical disk to indicate that the user data is being shared; and setting one or more share bits in the successor PLDMC to indicate that the data is being shared.

2. A method according to claim 1, wherein the step of populating the one or more LMAPs for the predecessor logical disk with RSD pointers comprises copying RSD pointers.

3. A method according to claim 1, wherein I/O operations to the successor logical disk are quiesced for a predetermined period of time.

4. A method according to claim 3, wherein the predetermined period of time corresponds to the time required to construct the predecessor logical disk.

5. A method according to claim 1, further comprising the steps of:

receiving a write operation directed to memory located in an identified segment(s) of the successor logical disk;

in response to the write operation, copying the identified segment(s) to the predecessor logical disk; and executing the write operation in the successor logical disk.

6. A method according to claim 5, further comprising the step of:

clearing share bits in the one or more LMAPs for the predecessor logical disk and the successor logical disk to indicate that the identified segments are no longer being shared; and clearing share bits in the successor PLDMC to indicate that identified segments are no longer being shared.

* * * * *

UNITED STATES PATENT AND TRADEMARK OFFICE
CERTIFICATE OF CORRECTION

PATENT NO. : 6,915,397 B2  Page 1 of 1
APPLICATION NO. : 10/080961
DATED : July 5, 2005
INVENTOR(S) : Clark E. Lubbers et al.

It is certified that error appears in the above-identified patent and that said Letters Patent is hereby corrected as shown below:

In column 20, line 66, in Claim 1, delete "processor" and insert -- predecessor --, therefor.

Signed and Sealed this

Thirteenth Day of July, 2010

David J. Kappos
*Director of the United States Patent and Trademark Office*